United States Patent [19]

Renaud et al.

[11] Patent Number: 4,613,028
[45] Date of Patent: Sep. 23, 1986

[54] CLUTCH RELEASE BEARING SUITABLE FOR AUTOMOTIVE VEHICLE

[75] Inventors: Pierre Renaud, Le Plessis-Trevise; Philippe Lassaiz, Boulogne, both of France

[73] Assignee: Valeo, Paris, France

[21] Appl. No.: 534,628

[22] Filed: Sep. 22, 1983

[30] Foreign Application Priority Data

Sep. 22, 1982 [FR] France ................. 82 15962

[51] Int. Cl.⁴ .............................................. F16D 23/00
[52] U.S. Cl. .................................... 192/98; 192/110 B
[58] Field of Search ............................. 192/98, 110 B

[56] References Cited

U.S. PATENT DOCUMENTS

| 3,815,715 | 6/1974 | Maucher | 192/98 |
| 3,885,658 | 5/1975 | Ernst et al. | 192/98 |
| 3,900,091 | 8/1975 | Maucher | 192/98 |
| 3,963,106 | 6/1976 | Ernst et al. | 192/110 B X |
| 4,362,229 | 12/1982 | Villata | 192/98 |

FOREIGN PATENT DOCUMENTS

| 7539627 | 4/1976 | Fed. Rep. of Germany . |
| 2090935 | 1/1972 | France . |
| 2186095 | 1/1974 | France . |
| 2190213 | 1/1974 | France . |
| 2224019 | 10/1974 | France . |
| 2246769 | 5/1975 | France . |
| 2255504 | 7/1975 | France . |
| 2332458 | 6/1977 | France . |
| 2347571 | 11/1977 | France . |
| 2058271 | 4/1981 | United Kingdom . |

Primary Examiner—Martin P. Schwadron
Assistant Examiner—Stephen M. Hepperle
Attorney, Agent, or Firm—Charles E. Brown; Charles A. Brown

[57] ABSTRACT

The operating member of a clutch release bearing suitable for an automotive vehicle is associated with a generally annular bush. This is constrained to move in the axial direction with the operating member, at least in the axial direction in which a corresponding control member is operative. The bush has at least one integral radial arm for the control member to act on. On the rear side of the or each arm relative to the direction in which the control member is operative, the bush comprises at least one integral reinforcing rib. On the front side of the or each arm there is disposed a protective member adapted to have the control member act on it.

19 Claims, 5 Drawing Figures

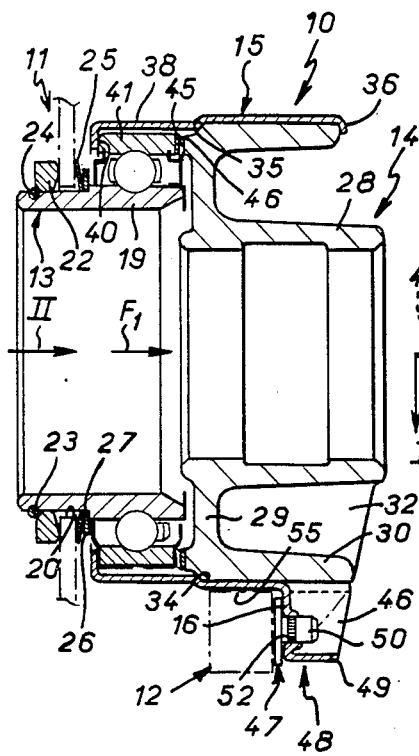
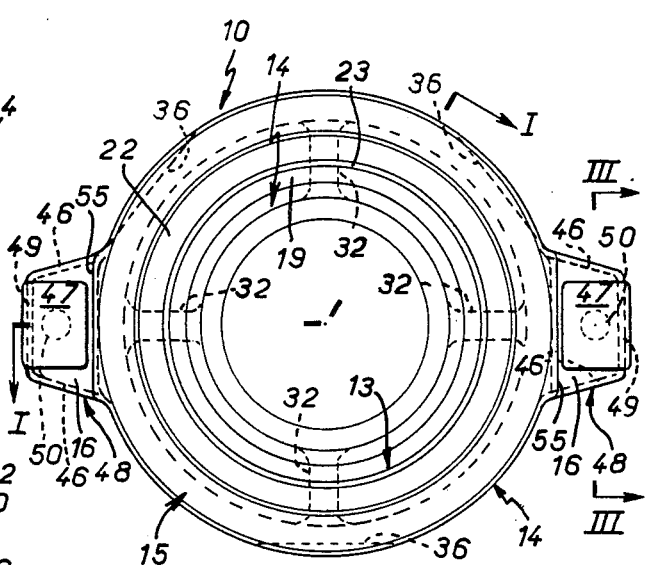
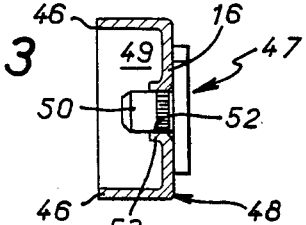
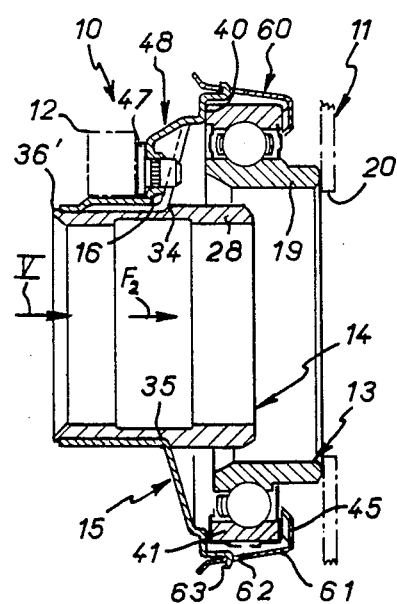
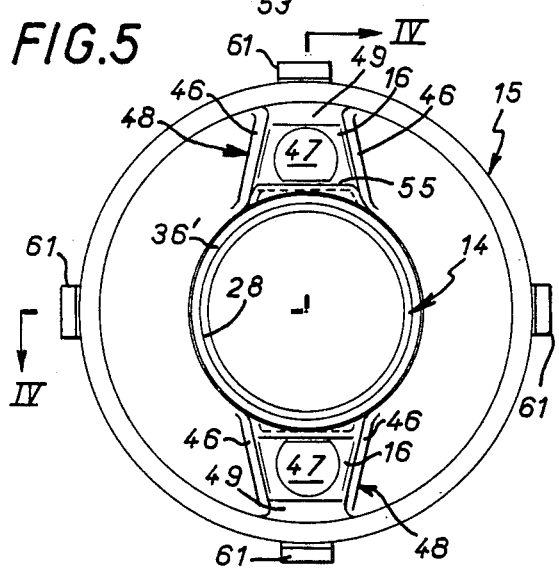

CLUTCH RELEASE BEARING SUITABLE FOR AUTOMOTIVE VEHICLE

BACKGROUND OF THE INVENTION

1. Field of the Invention

The present invention is generally concerned with clutch release bearings, in particular designed to be fitted to automotive vehicles.

2. Description of the Prior Art

As is known, a clutch release bearing generally comprises a drive member, by means of which it is adapted to act on the clutch release device of the clutch it is designed to control, an operating member through the intermediary of which it is adapted to be acted on by a control member, in practice a yoke member commonly referred to as the clutch release yoke, and means coupling together said drive member and said operating member in the axial direction.

The present invention is more particularly directed to clutch release bearings of this kind in which there is provided, in association with the operating member, a generally annular member, referred to hereinafter for convenience as a bush, constrained to move with said operating member in at least one direction, being the axial direction in which said control member is operative, and which has at least one integral radial arm on which said control member acts, and in practice two such arms.

A bush of this kind, in thus providing the arms necessary for the control member to act on, offers the advantage of simplifying the design of the operating member.

Moreover, it may also, if required, itself constitute all or part of the coupling means coupling the drive member to the operating member in the axial direction.

A clutch release bearing equipped with a bush of this kind is described in particular in French Pat. No. 2 090 935 filed Apr. 29, 1971 under the number 71 15343.

In practice, the clutch release bearing described in this French Patent is more particularly intended for fitting to touring vehicles.

Being a clutch release bearing designed to be *slidably mounted* on a guide member, its operating member is reduced to a sleeve to part of which the associated bush is axially coupled, this bush itself forming the coupling means which couple the corresponding drive member to the operating member in the axial direction, said bush being for this purpose crimped to the latter member.

As a corollary to this, the arms provided by this bush for the control member to act on form part of a flange extending in a generally transverse direction which is substantially flat and on which said control member bears directly.

Such arrangements can prove satisfactory, particularly when fitted to touring vehicles.

They have disadvantages, however, especially in the case of fitting to industrial vehicles.

First of all, to be able to withstand the wear to which it is inevitably subjected in service due to contact with the control member, the bush, which is in practice of metal, must receive appropriate hardening treatment.

Apart from the fact that such hardening treatment, which is in practice a quench treatment, may result in unwanted deformation of the bush, once hardened the bush is not so well suited to subsequent crimping operations.

To permit such crimping, it must be locally annealed, calling for a further operation and so increasing the cost.

Furthermore, to be able to withstand the bending loads to which they are subjected in service by virtue of the axial clutch release load applied to them by the control member, the radial arms of the bush, or in this instance the transverse flange of which they form part, must have sufficient rigidity.

The blank from which the bush is in practice stamped must therefore have a certain thickness, which makes more difficult the stamping operations required to form it and the crimping operations to which it is subsequently subjected, as already mentioned.

In the case of industrial vehicles, in which the axial clutch release load deployed is relatively high, this thickness becomes excessive.

A general object of the present invention is an arrangement by means of which these disadvantages may be overcome and also conferring further advantages.

SUMMARY OF THE INVENTION

The invention consists in a clutch release bearing suitable for an automotive vehicle, comprising a clutch release device, a drive member adapted to act on said clutch release device, an operating member through the intermediary of which said clutch release bearing is adapted to be acted on by a control member which is operative in an axial direction, means adapted to couple together said drive member and said operating member in the axial direction, a bush associated with said operating member and constrained to move therewith in the axial direction in which said control member is operative, at least one radial arm integral with said bush, at least one integral reinforcing rib on the rear side of the or each of said arms relative to the axial direction in which said control member is operative, and a protective member on the front side of the or each of said arms relative to the axial direction in which said control member is operative adapted to be acted on by said control member.

For preference, the or each arm is formed with a hole and the protective member comprises a pad which incorporates a projecting retaining peg which is adapted to be forced-fitted into the hole, the or each arm and the or each reinforcing rib form part of a stamping formed to this end in the bush, the stamping forms two reinforcing ribs on the rear side of the or each arm and the or each arm has along its outer edge a lip linking the reinforcing ribs.

Be this as it may, by virtue of its reinforcing rib(s), the or each arm of the bush is of itself sufficiently rigid to withstand the axial clutch release load applied to it in service by the control member and its thickness, and therefore that of the metal blank from which the bush is formed, may with advantage be relatively thin.

Apart from the resulting savings in materials and weight, the stamping out of the bush is facilitated as is subsequent crimping of the bush, if required.

Moreover, by virtue of the protective member associated with the or each arm, it is no longer necessary to apply any hardening treatment to the bush, which is advantageously favourable to retaining the bush geometry correct and which offers the further advantage of eliminating the need for any annealing operation where the bush must be subsequently subjected to a crimping operation.

French Pat. No. 2 255 504 filed Oct. 24, 1974 under the number 74 35677 describes a clutch release bearing in which radial arms needed for the control member to act on are formed by stampings.

These form part of the operating member, however, the part which they affect being formed by folding the sleeve back on itself.

Also, in the corresponding clutch release bearing, the drive member is not coupled to the operating member in the axial direction in the sense of the present application, said drive member to the contrary being freely movable in the axial direction relative to the operating member within limits defined by two end stops.

Thus this clutch release bearing differs in terms of its structure and its applications from the clutch release bearing which is the subject of the present application.

German Utility Model No 7539627 of Dec. 12, 1975 describes a clutch release bearing comprising stampings for the control member to act on to each of which there is attached a protective member. These stampings form part of the operating member and the primary function of the associated reinforcing members is to constitute the coupling means necessary to couple the drive member to the operating member in the axial direction.

Because of this they are subject to various loads, which may compromise the required action.

In accordance with one preferred feature of the invention, which results in an advantageous separation of functions, the only function of the protective member disposed on the or each arm of the bush is to protect it from the control member.

By virtue of the arrangement in accordance with the invention, the operating member may be advantageously lightened and its manufacture advantageously simplified.

The or each arm necessary for the control member to act on has been removed from it, being instead formed on the associated bush.

In accordance with another preferred feature of the invention, the or each arm has along its inner edge an axial flat adapted to guide the control member and to constrain the clutch release bearing to rotate therewith.

Thus a flat of this kind may also with advantage be eliminated from the operating member.

As a result, the operating member may with advantage be of generally cylindrical configuration and when, as is frequently the case with clutch release bearings designed for fitting to industrial vehicles, this part is of cast iron, the machining of its main part may with advantage be carried out entirely on a lathe, without requiring either milling or drilling.

Also, since the or each radial arm necessary for the control member to act on thus forms part of a bush separate from the operating member, there may easily be provided, if required and without substantially increasing the weight of the assembly, two radial arms with a gap between them in the diametral direction, irrespective of the diameter of the circumference along which the drive member has to bear on the clutch release device of the clutch to be controlled, so that there is considerable freedom with regard to the selection of the type of control member utilized.

The clutch release bearing in accordance with the invention is readily adaptable to a very wide range of gaps between the fingers of the clutch release yoke usually forming the control member.

For preference, the bush is constrained to move with the operating member in the axial direction in which the control member is operative and also in the axial direction opposite thereto, whereby it may with advantage constitute at least part of the coupling means which couple the drive member to the operating member in the axial direction, or even of itself constitute such coupling means.

To this end, it advantageously has two circumferential shoulders of different diameter, one adapted for contact with the operating member in the axial direction and the other adapted for contact with the drive member in the axial direction.

In accordance with a further preferred feature of the invention, these shoulders are directed in the same axial direction, being the direction in which the control member is operative.

As a result of this, the axial clutch release load applied by the control member to the drive member in service passes only through the bush, and not through the operating member.

Thus the operating member is subjected only to the sliding load of the clutch release bearing on the guide member on which it is engaged, and can therefore be advantageously lightened by making it smaller and/or by changing the material from which it is made, from cast iron to a synthetic material, for example.

Furthermore, the axial distance between the points of contact of the control member and the drive member on the clutch release bearing in the clutch release device of a clutch to be controlled may with advantage be made highly precise, even though involving only a few, if any, machining dimensions of the operating member. Thus it is all the easier for the forming of the bush to be reduced in practice to a stamping operation followed by the fitting of the reinforcing parts in a press, involving no additional machining.

Furthermore, when the clutch release bearing in question is a self-centering clutch release bearing of the maintained self-centering kind, that is to say when, between its drive member and its operating member there are disposed axially acting elastic means under the control of the means coupling them together in the axial direction, the necessary calibration of these axially acting elastic means may with advantage be made precise, favouring the required self-centering action.

Finally, since the two shoulders which it has, one for contact with the operating member in the axial direction and the other for contact with the drive member in the axial direction, are directed in the same axial direction, the bush which the clutch release bearing in accordance with the invention comprises is advantageously favorable to particularly easy assembly of the various component parts of the clutch release bearing, which may be carried out by simple axial stacking of said component parts, prior to the final crimping or snap-action coupling required to hold the assembly together.

Other objects and advantages will appear from the following description of examples of the invention, when considered with the accompanying drawing, and the novel features will be particularly pointed out in the appended claims.

BRIEF DESCRIPTION OF THE DRAWING

FIG. 1 is a view in axial cross-section on the line I—I in FIG. 2 of a clutch release bearing in accordance with the invention.

FIG. 2 is a view in elevation of this clutch release bearing in the direction of the arrow II in FIG. I.

FIG. 3 is a partial view of it to a different scale in cross-section parallel to the axis and on the line III—III in FIG. 2.

FIGS. 4 and 5 are views respectively analogous to those of FIGS. 1 and 2 and relating to an alternative embodiment.

DESCRIPTION OF THE PREFERRED EMBODIMENTS

FIGS. 1 and 2 illustrate the application of the invention to a "pull" type clutch release bearing 10, that is to say a clutch release bearing which, in order to release the clutch which it controls, operate in traction on the clutch release device 11 of the latter.

In other words, the control member 12 which controls to this end the clutch release bearing 10 must itself act on the latter in a direction such that it tends to move it away from the clutch release device 11, as indicated by the arrow F1 in FIG. 1.

In FIG. 1, the clutch release device 11 and the control member 12 are shown only partially and schematically, in dashed line.

For example, as shown, the clutch release device 11 may consist of the ends of the fingers of a diaphragm spring and the control member 12 may consist of a clutch release yoke, only one finger of which is schematically represented in FIG. 1.

Generally speaking, the clutch release bearing 10 in accordance with the invention generally comprises, in a manner known per se, a drive member 13 through which it is adapted to act on the clutch release device 11, an operating member 14 by means of which it is adapted to be acted on by the control member 12, coupling means, to be described in more detail subsequently, coupling said drive member 13 to said operating member 14 in the axial direction, and a generally annular member 15, hereinafter called for convenience a bush, which is associated with the operating member 14 which is constrained to move axially with the operating member 14, at least in the direction F1 in which the control member 12 is operative and which has at least one radial arm 16 for the control member 12 to act on.

In practice, as the control member 12 consists of a clutch release yoke generally comprising two fingers, two radial arms 16 are provided on the bush 15, in diametrically opposite positions relative to one another.

In the embodiment shown, the drive member 13 consists of a ball bearing the inner ring 19 of which is to this end provided with an axial extension by means of which it is engaged through the central aperture 20 in the diaphragm spring constituting the clutch release device 11.

On the other side of this diaphragm spring there is associated with this inner ring 19 a bearing ring or collar 22 through which it acts on the latter.

In the embodiment shown, this bearing collar 22 is independent of the inner ring 19.

Coupled axially to this inner ring 19 through the intermediary of an elastic ring 23, for example a split elastic ring engaged in a groove 24 formed for this purpose in said inner ring 19, it bears axially on the clutch release device 11, on the side of the latter opposite the clutch release bearing it.

On the side if this clutch release device 11 towards the clutch release bearing 10 there is provided an elastic ring 25, a Belleville washer for example, which bears in the axial direction through the intermediary of a distribution ring 26 on a shoulder 27 of the inner ring 19 of the bearing constituting the drive member 13. It bears axially on the clutch release device 11 so as to elastically hold against the latter, by reaction, the bearing collar 22 associated with said inner ring 19.

In the embodiment shown, the operating member 14 is of unitary construction and comprises a central sleeve 28 designed to permit sliding engagement of the assembly on any appropriate guide member (not shown), a transverse flange 29 extending radially outwards at one end of the central sleeve 28, in practice that nearest the drive member 13, and a peripheral ring 30 which extends from this transverse flange 29 parallel to the central sleeve 28 and on the same side as the latter. It is linked to the sleeve 28 by spaced radial ribs 32 forming spacers.

In practice, the resulting operating member 14 is generally cylindrical and may for example be made from cast iron, especially in the case of a clutch release bearing designed to be fitted to industrial vehicles, or of a synthetic material.

The bush 14 associated with this operating member 15 extends annularly around the peripheral ring 30 of the latter, being applied against this peripheral ring 30 which acts as a centering member.

To couple it to this operating member 14 in the axial direction F1 in which the control member 12 is operative, the bush 15 has a transverse shoulder 34 which is directed in this axial direction F1 and by means of which it contacts a shoulder 35 formed for this purpose on the drive member at that end of its peripheral ring 30 nearest the drive member 13.

In the embodiment shown, the bush 15 is in practice coupled to the operating member 14 in the axial direction F1 in which the control member 12 is operative and also in the opposite direction, such that it forms part of said operating member 14.

To this end, at the end of the peripheral ring 30 farthest from the drive member 13 it has spaced portions crimped radially inwards into contact with the corresponding edge of said peripheral ring 30 and thus forming spaced crimping tangs 36 directed in the axial direction opposite to the direction F1 in which the control member 12 is operative.

In the embodiment shown, three crimping tangs 36 appropriately spaced in the circumferential direction are provided.

Also, in this embodiment the bush 15 itself constitutes the means for coupling the drive member 13 to the operating member 14 in the axial direction.

To this end, the bush 15 comprises on the side of the dirve member 13, beyond its shoulder 34, an axial extension 38 which extends with clearance around this drive member 13, for radial retention of the latter within the limits imposed by said clearance. At its end, this extension 38 has a shoulder 40 extending radially inwards.

By virtue of this shoulder 40 the bush 15 is in axial contact with the drive member 13, more precisely with that of the edges of the outer ring 41 of the bearing constituting this drive member 13 which is farthest from the operating member 14.

In practice, this shoulder 40, which lies on a circumference of smaller diameter than the circumference on which the previously described shoulder 34 lies, is axially directed in the direction F1 in which the control member 12 is operative.

Thus, in accordance with the invention, the bush 15 has two circumferential shoulders 34, 40 of different diameters directed in the same axial direction, one adapted for contact with the operating member 14 in the axial direction and the other adapted for contact with the drive member 13 in the axial direction.

Because of the axial extension 38 of the bush 15, the shoulder 34 of the latter affects the median part, whereas the shoulder 40 is disposed at one end and its crimping tangs 36 at the other end.

In the embodiment shown, the clutch release bearing is in practice a self-centering clutch release bearing in which the self-centering action is maintained. There are therefore, between the drive member 13 and the operating member 14, axially acting elastic means under the control of the means coupling them in the axial direction.

In the embodiment shown, these axially acting elastic means consist of a corrugated ring 45, for example of the type marketed under the trade name "ONDU-FLEX", inserted between the edge of the outer ring 41 of the bearing constituting the drive member 13 which is nearest the operating member 14 and an annular boss 46 projecting axially to this end from the transverse flange 29 of this operating member 14 in the direction towards the drive member 13.

In accordance with the invention, on the rear side of each of its radial arms 16 relative to the direction F1 in which the control member 12 is operative, the bush 15 comprises at least one integral reinforcing rib 46. On the front side of each arm 16 is disposed a protection member 47 adapted to be acted on by said control member 12.

In practice, in the embodiment shown, each of the radial arms 16 and its reinforcing rib 47 conjointly form part of a stamping 48 formed to this end in the bush 15. Thus this stamping forms two reinforcing ribs 46 generally parallel to one another at the rear of each radial arm 15 and each of the latter has along its outer edge a lip 49 which links together the two reinforcing ribs 46.

Each stamping 48 is thus of generally parallelepiped shape open axially towards the rear relative to the direction F1 in which the control member 12 is operative and also radially inwards.

Moreover, in accordance with the invention the protective member 47 attached to each of radial arms 16 of the bush 15 has no other function than to protect the arm from the control member 12.

In the embodiment shown, this protective member is a pad, more precisely a pad of rectangular shape in this embodiment. For its attachment it comprises, in a manner known per se, a projecting peg 50 which is forced-fitted into a hole 52 punched for this purpose into the radial arm 15 concerned.

In practice, such punching results in the formation of a cylinder 53 extending in the axial direction around the hole 52 (FIG. 3).

In the embodiment shown, along the inner edge of each of its radial arms 16 the bush 15 has an axial flat 55 adapted to guide the control member 12 and to constrain the clutch release bearing 10 to rotate therewith.

Because of this, the cylindrical part which constitutes the operating member 14 requires only limited machining, all of which may be carried out on a lathe.

As will be seen, ignoring its flat 55, the bush 15 is applied intimately against the operating member 14, more precisely against the peripheral ring 30 of the latter, and it is constrained to rotate therewith by virtue of the crimping tangs 36.

As will also be noted, the arms 16 of the bush 15 offer a bearing surface to the control member 12 and are offset radially relative to the shoulder 40 of this bush 15 by virtue of which the latter is in axial contact with the drive member 13. The diametral distance separating these arms 16 may be readily adapted to the separation of the fingers of the clutch release yoke constituting the control member 12.

Also, by virtue of the fact that the shoulders 34 and 40 of the bush 15 through which the latter is in axial contact with the operating member 14 and the drive member 13 are directed in the same axial direction, the clutch release bearing 10 in accordance with the invention may with advantage be assembled by axial stacking in the same direction of its component parts within the bush 15, prior to final crimping of the latter.

Finally, as the flats 55 of the bush 15 are on a circumference of larger diameter than that around which extends its axial extension 38, the assembly of the unit comprising the motor, the clutch and the clutch release bearing to the unit comprising the gearbox and the clutch release yoke is advantageously facilitated, no obstacle due to the clutch release bearing impeding the pivoting of the clutch release yoke during this operation.

FIGS. 4 and 5 illustrate by way of example the application of the invention to a "push" type clutch release bearing 10, that is to say a clutch release bearing which operates by pushing on the clutch release device 11 of the clutch which it controls.

The corresponding control member 12 thus itself acts on this clutch release bearing 10 in a direction such that it urges the latter in the direction towards the clutch release device 11, as indicated by the arrow F2 in FIG. 4.

The inner ring 19 of the bearing constituting the drive member 13 is then in simple axial bearing engagement against the clutch release device 11, on the side of the latch towards the clutch release bearing 10.

In the embodiment shown, the operating member 14 is reduced to a simple sleeve 28.

As previously, the bush 15 associated with this operating member 14 is coupled to the latter, more precisely to the sleeve 28 which constitutes it, in both axial directions.

To this end and as previously it has, in the direction F2 in which the control member 12 is operative, a shoulder 34 by means of which it is in axial contact with a shoulder 35 of the sleeve 28. At its end, the latter has an annular crimping collar 36', extending radially outwards as a result of crimping, providing a further bearing shoulder for the bush 15 in the direction opposite the direction F2 in which the control member 12 is operative.

Also as previously, the bush 15 comprises two stampings 48 in diametrically opposite positions relative to one another, each forming a respective radial arm 16 adapted to be acted on by the control member 12 and to which is attached for this purpose a protective member 47, two reinforcing ribs 46 extending at the rear of each radial arm 16 in the direction F2 in which the control member 12 is operative and a lip 49 linking together these reinforcing ribs 46.

Finally, and as previously, the bush 15 comprises a shoulder 40 for axial contact with the bearing constituting the drive member 13, extending around a circumference of different diameter to that around which its shoulder 34 extends, and directed in the same axial direction as the latter.

However, in the embodiment shown, this shoulder 40 extends radially in the direction opposite to the axis of the assembly and the diameter of the circumference around which it extends is greater than that of the circumference around which the aforementioned shoulder 34 extends. Also, in the embodiment shown, the bush 15 constitutes only part of the means coupling the drive member 13 to the operating member 14 in the axial direction, these means being completed by a cap 60 which, by virtue of a front wall configured as an elastic ring 45, is in axial contact with the drive member 13, more precisely with the outer ring 41 of the bearing constituting the latter, on the side opposite the bush 15 and which, by virtue of axial lugs 61, of which there are four in the embodiment shown, is coupled to this bush 15, each lug 61 having a respective opening 62 by means of which it is engaged on a hook 63 provided for this purpose on the periphery of the bush 15.

Finally, in the embodiment shown, the pads constituting the protective member 47 are of generally circular shape.

It will be understood that various changes in the details, materials and arrangements of parts, which has been herein described and illustrated in order to explain the nature of the invention, may be made by those skilled in the art within the principle and scope of the invention as expressed in the appended claims.

For example, in the case of the embodiment shown in FIGS. 1 and 2 in particular, the reinforcing ribs 46 of a radial arm 16 of the bush 15 could be of triangular configuration, as schematically represented in chain-dotted lines in FIG. 1, no lip 49 being then provided at the end of the radial arms 16.

Also, in both embodiments, the protective member associated with each radial arm of the bush could be constituted by one of the branches of a stirrup-shaped member engaged radially on the arm, instead of consisting of a pad fitted axially to the arm.

Finally, if the operating member is of a synthetic material, axial retention of the associated bush to the operating member could be achieved by a snap-action fastener arrangement.

What I claim is:

1. A clutch release bearing for an automotive clutch comprising a drive member cooperable with a clutch release device, an operating member cooperable with a control member and operative in an axial direction for clutch release, a bush for axially coupling together said drive member and said operating member and being constrained to move with said operating member in said axial direction, at least one radial arm integral with said bush, at least one integral reinforcing rib on a rear side of said arm relative to said axial direction, and a protective member on a front side of said arm relative to said axial direction engageable with the control member, said bush having two axially spaced circumferential shoulders of different diameters directed in the same axial direction, one of said shoulders engaging said operating member in the clutch release axial direction and the other of said shoulders engaging with said drive member in the clutch release axial direction.

2. A clutch release bearing according to claim 1, wherein said protective member exclusively protects said arm from a control member.

3. A clutch release bearing according to claim 2, wherein said arm has a hole and said protective member comprises a pad which incorporates a projecting retaining peg force-fitted in said hole.

4. A clutch release bearing according to claim 1 wherein said bush comprises a stamping which also includes said arm and said reinforcing rib.

5. A clutch release bearing according to claim 4, wherein said stamping forms two of said reinforcing ribs on the rear side of said arm to respective sides of said protective member.

6. A clutch release bearing according to claim 5, wherein said arm has along its outer edge a lip linking said reinforcing ribs.

7. A clutch release bearing according to claim 1, wherein said arm has along its inner edge an axial flat adapted to guide the control member and to constrain said clutch release bearing against rotation.

8. A clutch release bearing according to claim 1, wherein said bush is constrained to move with said operating member in both axial directions.

9. A clutch release bearing according to claim 1, wherein said protective member is disposed radially outwardly of the said operating member and said drive member.

10. A clutch release bearing for an automotive clutch, comprising a drive member cooperable with a clutch release device, an operating member cooperable with a control member and operative in an axial direction for clutch release, said operating member further comprising a bush associated with said operating member and being constrained to move therewith in said axial direction, clip means for axially coupling said drive member to said bush in said axial direction, at least one radial arm integral with said bush, said drive member bearing axially against said bush, at least one integral reinforcing rib on a rear side of said arm relative to said axial direction, and a protective member on a front side of said arm relative to said axial direction engageable with the control member, said bush having two axially spaced circumferential shoulders of different diameters directed in the same axial direction, one of said shoulders engaging said operating member in the clutch release axial direction and the other of said shoulders engaging with said drive member in the clutch release axial direction.

11. A clutch release bearing according to claim 10, wherein said protective member exclusively protects said arm from a control member.

12. A clutch release bearing according to claim 11, wherein said arm has a hole and said protective member comprises a pad which incorporates a projecting retaining peg force-fitted in said hole.

13. A clutch release bearing according to claim 10, wherein said bush comprises a stamping which also includes said arm and said reinforcing rib.

14. A clutch release bearing according to claim 13, wherein said stamping forms two of said reinforcing ribs on the rear side of said arm, to respective sides of said protective member.

15. A clutch release bearing according to claim 14, wherein said arm has along its outer edge a lip linking said reinforcing ribs.

16. A clutch release bearing according to claim 10, wherein said arm has along its inner edge an axial flat adapted to guide the control member and to constrain said clutch release bearing against rotation.

17. A clutch release bearing according to claim 10, wherein said bush is constrained to move with said operating member in both axial directions.

18. A clutch release bearing according to claim 10, wherein said arm is radially offset relative to said other shoulder which engages said drive member.

19. A clutch release bearing according to claim 10, wherein said operating member comprises a sleeve for mounting said release bearing for axial movement, said drive member being disposed radially outwardly of said sleeve and said protective member being disposed generally in axial alignment with said drive member.

* * * * *